(12) United States Patent
Muraki

(10) Patent No.: US 6,197,942 B1
(45) Date of Patent: Mar. 6, 2001

(54) CHITOOLIGOSACCHARIDE DERIVATIVE

(75) Inventor: Einosuke Muraki, Osaka (JP)

(73) Assignee: Agency of Industrial Science and Technology Ministry of International Trade and Industry, Tokyo (JP)

( * ) Notice: Subject to any disclaimer, the term of this patent is extended or adjusted under 35 U.S.C. 154(b) by 0 days.

(21) Appl. No.: 09/429,905

(22) Filed: Oct. 29, 1999

(30) Foreign Application Priority Data

Nov. 17, 1998 (JP) .................................................. 10-344902

(51) Int. Cl.$^7$ .......................... C08B 37/08; A61K 31/739
(52) U.S. Cl. .......................... 536/20; 536/55.2; 536/55.3; 514/55
(58) Field of Search .......................... 536/20, 55.2, 55.3

(56) References Cited

U.S. PATENT DOCUMENTS 5,175,149 * 12/1992 Stacey et al. .......................... 514/23
5,549,718 * 8/1996 Lerouge et al. ...................... 47/57.6
5,696,098 12/1997 Muraki .................................. 514/55

* cited by examiner

*Primary Examiner*—Howard C. Lee
(74) *Attorney, Agent, or Firm*—Oblon, Spivak, McClelland, Maier & Neustadt, P.C.

(57) ABSTRACT

A chitooligosaccharide residue is disclosed which is represented by the formula:

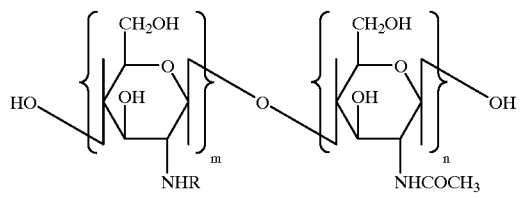

wherein $m=1-20$, $n=1-20$, $m+n=2-21$, and $m/n=5-0.05$, and R represents a saturated or unsaturated aliphatic acyl group of 3–24 carbon atoms.

8 Claims, No Drawings

CHITOOLIGOSACCHARIDE DERIVATIVE

BACKGROUND OF THE INVENTION

1. Field of the Invention

FIELD OF THE INVENTION

This invention relates to a chitooligosaccharide derivative.

2. Prior Art Statement

The chitooligosaccharide, i.e. an oligomer of the N-acetyl glucosamine derived from chitin, has been attracting attention for its biodegradability and excellence in bioadaptability.

The chitooligosaccharide has, however, been finding utility only in a limited range of applications on account of its high solubility in water.

SUMMARY OF THE INVENTION

This invention is aimed at providing a novel derivative of the chitooligosaccharide which possesses adapt ability to living organisms, raises absolutely no environmental problems and is suitable for new applications.

Specifically, this invention concerns a derivative of the chitooligosaccharide, i.e. a novel substance which consists essentially of "m" number of:

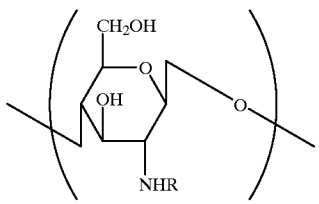

and "n" number of

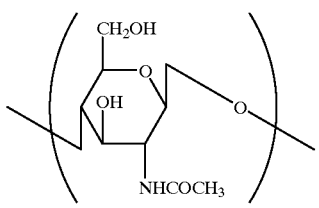

and possessing an OH group at the 4 position or 1 position of the terminal constituent unit, wherein m=1–20, n =1–20, m+n=2–21, and m/n=5–0.05, and R represents a saturated or unsaturated aliphatic acyl group of 3–24 carbon atoms.

DESCRIPTION OF THE PREFERRED EMBODIMENTS

Specific examples of the saturated or unsaturated fatty acid represented by R include linear or branched saturated or unsaturated aliphatic acyl groups of 3–24, preferably 6–18, carbon atoms such as acryloyl, propionyl, butylyl, isobutylyl, valeryl, isovaleryl, pivaloyl, hexanoyl, octanoyl, decanoyl, lauroyl, myristoyl, palmitoyl, stearoyl, oleoyl, eicosanoyl, docosanoyl, and tetracosanoyl. Preferred examples of the acyl group include octanoyl, decanoyl, lauroyl, myristoyl, palmitoyl, stearoyl, and oleoyl.

The reason for limiting the number of carbon atoms of the acyl group to the range of 3–24 is that the number of carbon atoms of the fatty acid contained in oil, fat or wax as the raw material for the fatty acid falls in this range.

The reason for limiting the number of carbon atoms of the acyl group to the preferred range of 6–18 is that the chitooligosaccharide derivative, when used as a surfactant, acquires excellent properties as manifested in emulsifying power, permeability, and solubility.

The reason for the particular preferability of octanoyl, decanoyl, lauroyl, myristoyl, palmitoyl, stearoyl, and oleoyl groups is that the emulsion prepared by using the chitooligosaccharide derivative as a surfactant exhibits excellent stability (ability to retain the state of emulsification for a long time) and manifests high compatibility with the fatty acid forming oil, fat, and wax on account of having the same component as the fatty acid.

The reason for limiting the integers, m and n, used in the formula representing the derivative of the chitooligosaccharide of this invention both to the range of 1–20, preferably to the range of 1–9, is that the size of the sugar chain moiety of the derivative must be limited to a proper range in consideration of the solubility in the solvent (for the solubility is degraded by an unduly large sugar chain).

The reason for limiting the sum, m+n, to the range of 2–21, preferably the range of 2–10, is that the size of the sugar chain moiety of the derivative must be limited, as mentioned in the preceding paragraph, to a proper range in consideration of the solubility in the solvent.

The reason for limiting the ratio, m/n, to the range of 5–0.05, preferably to the range of 1–0.2, is that an unduly large ratio of introduction deviating from this range barely allows the derivative to manifest the effect of a surfactant and makes control of the ratio of introduction difficult.

The chitooligosaccharide derivative of this invention can be obtained by deacetylating chitin into chitosan, hydrolyzing the chitosan to obtain a chitooligosaccharide, and causing this chitooligosaccharide to react with an acetylating agent and an acylating agent represented by R—O—R or R—Cl in the presence or absence of a solvent. Where R happens to represent the acyl group of a higher fatty acid, the acid chloride of R—Cl proves preferable in terms of reactivity.

The solvent is preferred to be a polar solvent capable of dissolving and dispersing an oligosaccharide. Specific polar solvents answering this description include dimethyl formamide, dimethyl acetamide, dimethyl sulfoxide, acetic acid, pyridine, acetonitrile, dioxane, and morpholine. The acylating agent may be added dropwise to such a solvent in the presence of a base such as pyridine or triethyl amine. The acylating agent is used in an amount in the approximate range of 0.1–1 mol, per mol of the glucosamine residue. The base is used in an amount in the approximate range of 1 mol to an excess amount based on one mol of the acylating agent. Where the acid chloride is used, it is preferred to be diluted with a chlorine type solvent. The reaction is carried out at a temperature in the range of 0–40° C. for a period in the range of 1–3 hours.

The reaction of acylation prefers the introduction of the R group of inferior reactivity to precede the acetylation. This reaction has only to be effected by sequentially adding the acetylating agent such as, for example, acetyl chloride or acetic anhydride after the addition of the acylating agent such as R—Cl or R—O—R.

When the reaction of acetylation is effected on acetic anhydride in the presence of sodium acetate by using a hydrated alcohol such as an aqueous 50% methanol solution as a solvent, the remaining amino group can be perfectly acetylated because the solvent has high solubility in an oligosaccharide.

The chitooligosaccharide derivative of this invention, depending on the purpose of use, does not need to be used as an isolated refined simple compound. As a surfactant, it is practical to use it in the form of various mixtures of compounds represented by the formulas mentioned above.

The chitooligosaccharide derivative of this invention can be used as a nonionic surfactant. It promises utility in a wide range of applications particularly because it is low in toxicity and is little affected by coexisting ions or pH value. Specifically, it can be expected to be used as bubble stabilizer, emulsifier, dispersant, and detergent in foodstuffs, pharmaceutical preparations, toiletry articles, cosmetic articles, and agricultural pesticides. Specific examples of cosmetic articles include various oil-in-water type and water-in-oil type creams such as vanishing cream, cold cream, emollient cream, cleansing cream, massage cream, moisture cream, and hand cream.

For example, the chitooligosaccharide derivative of this invention is useful as a surfactant because it possesses a long-chain hydrophobic group in combination with a hydrophilic group originating in saccharide.

The chitooligosaccharide derivative of this invention is biodegradable and safe from causing environmental problems because it is composed of a saturated or unsaturated fatty acid, glucosamine, and acetic acid.

Since the surfactant which is formed of the chitooligosaccharide derivative of this invention is a nonionic type surfactant, the properties thereof are not affected by such factors as pH, ionic strength, and coexisting ions.

When the number of carbon atoms of the fatty acid to be introduced is increased, the tendency to form a micelle increases and the ability to form emulsion is heightened. When the number of carbon atoms is decreased, the permselectivity is improved and diffusion into fine tissue is facilitated. It therefore suffices to select the fatty acid to be introduced to suit the intended use. It is also permissible to have different species of fatty acid mixed in one and the same molecule or to use different oligosaccharides of the introduced fatty acid in a mixed state.

This invention will now be described more specifically with reference to working examples.

EXAMPLE 1

In 105 ml of dimethyl formamide (DMF), 3.5 g of the hydrochloride of chitooligosaccharide octomer (the hydrochloride of glucosamine octomer) was dispersed. The resultant dispersion, 10.5 ml of triethylamine and 0.7 ml of acetic anhydride and left standing for 5 to 6 hours. As a result, the oligosaccharide was thoroughly dispersed in the solvent and swelled. To the swelled mixture, 28 ml of chloroform containing 1.4 ml of lauroyl chloride was added at the rate of 1 ml/min. After about three hours, the produced mixture was added with 3.5 ml of acetic anhydride and stirred for one hour to complete the reaction. The obtained product was the perfect N-acyl form. After completion of the reaction, the reaction solution was placed under a reduced pressure to expel the volatile component to the fullest possible extent and then extracted from ether to effect thorough removal of the volatile component. The residue of the extraction from ether was dissolved and dispersed in water and then centrifuged to obtain a component insoluble in water. The component soluble in water was deionized with an ion-exchange resin and then freeze dried.

The yield of the product, the lauroylated glucosamine component (m), and the acetylated glucosamine component (n) are shown below.

|  | Yield | m | n |
|---|---|---|---|
| Water-insoluble component | 1.4 g | 3.8 | 4.2 |
| Water-soluble component | 2.1 g | 1.5 | 6.5 |

EXAMPLE 2

In 180 ml of methanol, 3 g of the hydrochloride of chitooligosaccharide octamer (the hydrochloride of glucosamine octomer) was dispersed. The resultant dispersion was added with 6 ml of triethylamine. To the oligosaccharide dispersion, 45 ml of chloroform containing 15 ml of stearoyl chloride was added at the rate of 0.5 ml/2 minutes. After not less than two hours, the reaction solution was alkalinized by addition of an aqueous sodium hydroxide solution and then concentrated under a reduced pressure to expel the volatile component and extract the insoluble component. The insoluble component (partially stearoylated oligosaccharide) was separated by either centrifugation or filtration and cleaned with water. The produced insoluble component was dispersed in 200 ml of an aqueous 50% methanol solution, acidified with 5 ml of acetic acid, and allowed to effect N-acetylation of the residue by addition of 3 ml of acetic anhydride. Perfect N-acyl form was obtained. The reaction solution was concentrated under a reduced pressure, deionized with an ion-exchange resin, and then freeze dried.

The yield of the product was 3.98 g, the stearoylated glucosamine component, m, was 2.8, and the acetylated glucosamine component, n, was 5.2.

EXAMPLE 3

In 150 ml of an aqueous 50% methanol solution, 3 g of the hydrochloride of chitooligosaccharide (the hydrochloride of an equivolumetric mixture of pentamer and hexamer) was dissolved. The produced solution and 20 ml of 1M sodium acetate and 0.5 ml of acetic anhydride added thereto were stirred for five hours. The resultant mixture was converted into a perfect N-acyl form by further addition of 2.5 ml of acetic anhydride. The reaction solution was concentrated under a reduced pressure, deionized with an ion-exchange resin, and then freeze dried.

The yield of the product was 2.65 g, the butylylated glucosamine component, m, was 1.1, and the acetylated glucosamine component, n, was 4.4.

Applied Example 1

Typical formulas for vanishing cream (table 1) as an emulsifier for dispersion in water and cold cream (table 2) as an emulsifier for dispersion in oil are shown below.

TABLE 1

| | |
|---|---|
| The water-soluble oligosaccharide derivative of Example 1 | 3.2 g |
| Stearic acid | 13.5 g |
| Propylene glycol | 25.0 g |
| Glycerin | 5.0 g |
| Sodium hydroxide | 0.5 g |
| Purified water | Balance |
| Perfume, coloring agent, and preservative | Suitable amount |
| Total | 100.0 g |

TABLE 2

| | |
|---|---|
| The oligosaccharide of Example 2 | 6.5 g |
| Paraffin | 5.0 g |
| Lanolin | 10.0 g |
| Liquid paraffin | 20.0 g |
| Isopropyl myristate | 10.0 g |
| Purified water | Balance |
| Coating material, coloring agent, and preservative | Suitable amount |
| Total | 100.0 g |

The vanishing cream shown in table 1 and the cold cream shown in table 2 both exhibited excellent qualities as cosmetic articles.

What is claimed is:

1. A chitooligosaccharide derivative consisting essentially of:

a) "m" number of components with the following chemical structure:

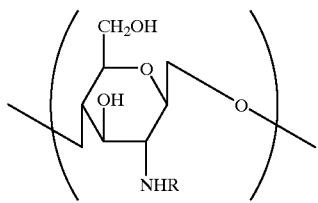

and b) "n" number of components with the following chemical structure;

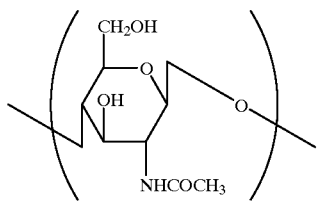

wherein m is in the range of 1–16 and n is in the range of 5–20; and
wherein R represents a saturated or unsaturated aliphatic acyl group of 3–24 carbon atoms.

2. A chitooligosaccharide derivative according to claim 1, wherein R is one aliphatic acyl group selected from the class consisting of acryloyl, propionyl, butylyl, isobutylyl, valeryl, isovaleryl, pivaloyl, hexanoyl, octanoyl, decanoyl, lauroyl, myristoyl, palmitoyl, stearoyl, oleoyl, eicosanoyl, docosanoyl, and tetracosanoyl.

3. A chitooligosaccharide derivative according to claim 1, wherein R is an aliphatic acyl group of 6–18 carbon atoms.

4. A chitooligosaccharide derivative according to claim 1, wherein R is one member selected from the class consisting of octanoyl, decanoyl, lauroyl, myristoyl, palmitoyl, stearoyl, and oleoyl.

5. The chitooligosaccharide derivative of claim 1, wherein m/n is in the range of 5–0.05.

6. The chitooligosaccharide derivative of claim 1, wherein m/n is in the range of 1–0.2.

7. The chitooligosaccharide derivative of claim 1, wherein m/n is in the range of 0.5–3.2.

8. A chitooligosaccharide derivative consisting essentially of:

a) "m" number of components with the following chemical structure:

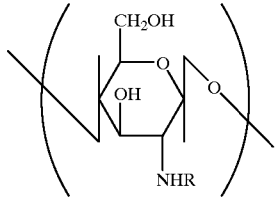

b) "n" number of components with the following chemical structure:

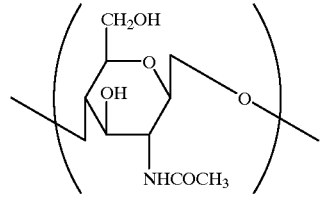

wherein m+n is in the range of 6–21; and
wherein R represents a saturated or unsaturated aliphatic acyl group of 3–24 carbon atoms.

* * * * *